US008799869B2

(12) United States Patent
Grechanik

(10) Patent No.: US 8,799,869 B2
(45) Date of Patent: Aug. 5, 2014

(54) SYSTEM FOR ENSURING COMPREHENSIVENESS OF REQUIREMENTS TESTING OF SOFTWARE APPLICATIONS

(75) Inventor: Mark Grechanik, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 226 days.

(21) Appl. No.: 13/251,931

(22) Filed: Oct. 3, 2011

(65) Prior Publication Data

US 2013/0086556 A1   Apr. 4, 2013

(51) Int. Cl.
*G06F 9/44* (2006.01)
*G06F 11/36* (2006.01)

(52) U.S. Cl.
CPC .................. *G06F 11/3676* (2013.01)
USPC .......................................... 717/126

(58) Field of Classification Search
CPC ................................. G06F 11/3676
USPC .......................................... 717/124
See application file for complete search history.

(56) References Cited

U.S. PATENT DOCUMENTS

| 7,174,348 | B1* | 2/2007 | Sadhu et al. ................... 1/1 |
| 2002/0042687 | A1* | 4/2002 | Tracy et al. ................... 702/119 |
| 2005/0166094 | A1* | 7/2005 | Blackwell et al. .............. 714/38 |
| 2007/0106982 | A1* | 5/2007 | Dalal et al. .................... 717/128 |
| 2007/0130561 | A1* | 6/2007 | Siddaramappa et al. ..... 717/106 |
| 2007/0162522 | A1* | 7/2007 | Sengupta et al. ............. 707/203 |
| 2008/0263505 | A1* | 10/2008 | StClair et al. ................. 717/101 |

OTHER PUBLICATIONS

Asuncion et al.; "Software Traceability with Topic Modeling"; ICSE '10, May 2-8, 2010.*
Murphy et al.; "Software Reflexion Models: Bridging the Gap between Source and High-Level Models"; SIGSOFT '95; Oct. 10-13, 1995.*
HP Quality Center tutorial; "Auto-generation of Test Cases from Requirements"; f14testing.com website; Jan. 21, 2010.*
Revelle et al.; "An exploratory study on assessing feature location techniques"; IEEE 17th International Conference on Program Comprehension (ICPC'09); 2009.*
Abadi et al., "A Traceability Technique for Specifications" Proc. of 16th IEEE International Conference on Program Comprehension (ICPC'08), 2008, pp. 103-112.

(Continued)

*Primary Examiner* — Qing Chen
*Assistant Examiner* — Clint A Thatcher
(74) *Attorney, Agent, or Firm* — Brinks Gilson & Lione

(57) ABSTRACT

A method for determining a comprehensiveness of software requirements tests for testing a software application includes receiving data that defines artifacts of a software project. A first sub-link between at least one application requirement and at least one code module of the application code is identified. The first sub-link indicates a relationship between the application requirement and the code module. A second sub-link between at least one test case and the code module is identified. The second sub-link indicates a relationship between the test case and the module. A traceability link between the test case and the application requirement is determined based on the first sub-link and the second sub-link. The traceability link indicates that the test case tests the software application for compliance with the application requirement.

20 Claims, 8 Drawing Sheets

(56) References Cited

OTHER PUBLICATIONS

Antoniol et al., "Information Retrieval Models for Recovering Traceability Links between Code and Documentation" Proc. of IEEE International Conference on Software Maintenance (ICSM'00), San Jose, CA, Oct. 11-14, 2000. pp. 40-49.
Antoniol et al., "Tracing Object-Oriented Code into Functional Requirements", in Proc. of 8th International Workshop on Program Comprehension (IWPC'00), Limerick, Ireland, Jun. 10-11 2000, pp. 79-87.
Antoniol et al., "Recovering Traceability Links between Code and Documentation", IEEE Transactions on Software Engineering, vol. 28, No. 10, Oct. 2002, pp. 970-983.
Antoniol et al, "Recovering Code to Documentation Links in OO Systems", in Proc. of 6th IEEE Working Conference on Reverse Engineering (WCRE'99), Atlanta, GA, Oct. 6-8, 1999, pp. 136-144.
Antoniol et al. "Traceability Recovery by Modeling Programmer Behavior", in Proc. of 7th IEEE Working Conference on Reverse Engineering (WCRE'00), Brisbane, Australia, 2000, pp. 240-247.
Asuncion et al., "Software Traceability with Topic Modeling", in Proc. of 32nd International Conference on Software Engineering (ICSE'10), 2010, pp. 95-104.
Asuncion et al., "An End-to-End Industrial Software Traceability Tool" Proc. of ESEC/SIGSOFT FSE 2007, pp. 115-124.
Bacchelli et al., "Extracting Source Code from E-Mails", in 18th IEEE International Conference on Program Comprehension (ICPC'10), 2010, pp. 24-33.
Bacchelli, et al., "Benchmarking Lightweight Techniques to Link E-Mails and Source Code", in 16th Working Conference on Reverse Engineering (WCRE'09), 2009, pp. 205-214.
Bacchelli et al., "Linking e-mails and source code artifacts", in $32^{nd}$ ACM/IEEE International Conference on Software Engineering (ICSE'10). Cape Town, South Africa, 2010, pp. 375-384.
Baeza-Yates, R. A. and Ribeiro-Neto, B., Modern Information Retrieval, Addison-Wesley, 1999, 526 pages.
Baldi et al., "A Theory of Aspects as Latent Topics" in Proc. of ACM SIGPLAN Conference on Object-Oriented Programming, Systems, Languages and Applications (OOPSLA'08), Nashville, Tennessee, 2008, pp. 543-562.
Bandyopadhyay et al., "Test Input Generation using UML Sequence and State Machines Models", in Proc. of International Conference on Software Testing Verification and Validation (ICST'09), 2009, pp. 121-130.
Blei et al., "Latent Dirichlet Allocation", Journal of Machine Learning Research, vol. 3, 2003, pp. 993-1022.
Briand et al., "Using Coupling Measurement for Impact Analysis in Object-Oriented Systems", in Proc. of IEEE International Conference on Software Maintenance (ICSM'99), Aug. 30-Sep. 3, 1999, pp. 475-482.
Buchta et al, "Teaching Evolution of Open Source Projects in Software Engineering Courses", in Proc. of 22nd IEEE International Conference on Software Maintenance (ICSM'06), 2006, pp. 136-144.
Burnim et al., "Heuristics for Scalable Dynamic Test Generation" in Proc. of 23rd IEEE/ACM International Conference on Automated Software Engineering (ASE'08), L'Aquila, Italy, Sep. 15-19 2008, pp. 443-446.
Cai et al., "The Effect of Code Coverage on Fault Detection under Different Testing Profiles" AMOST'05, St. Louis, Missouri, USA, May 15-16, 2005, pp. 1-7.
Capobianco et al., "On the Role of the Nouns in IR-based Traceability Recovery" in Proc. of $17^{th}$ IEEE International Conference on Program Comprehension (ICPC'09) Vancouver, British Columbia, Canada, May 17-19, 2009, pp. 148-157.
Capobianco et al., "Traceability Recovery using Numerical Analysis" 16th Working Conference on Reverse Engineering (WCRE'09) Lille, France, 2009, pp. 195-204.
Chang et al., "Hierarchal Relational Models for Document Networks" Annals of Applied Statistics, vol. 4, No. 1, 2010, pp. 124-150.
Chen et al., "An Empirical Study of the Correlation between Code Coverage and Reliability Estimation" Proc. of $3^{rd}$ International Symposium on Software Metrics (Metrics'96) Berlin, Germany, Mar. 25-26, 1996, pp. 133-141.
Cleland-Huang et al., "Event-Based Traceability for Managing Evolutionary Change" IEEE Transactions on Software Engineering, vol. 29, No. 9, 2003, pp. 796-810.
Cleland-Huang et al., "Utilizing Supporting Evidence to Improve Dynamic Requirements Traceability" in 13th IEEE International Conference on Requirements Engineering (RE'05). Paris, France, 2005, 10 pages.
Cohen et al., "Constructing Test Suites for Interaction Testing" Proc. of 25th IEEE/ACM International Conference on Software Engineering (ICSE'03), Portland, Oregon, USA, May 3-10 2003, pp. 1-11.
Čubranić et al., "Hipikat: Recommending Pertinent Software Development Artifacts" in Proc. of 25th International Conference on Software Engineering (ICSE'03), Portland, Oregon, USA, May 2003, pp. 1-11.
Čubranić et al., "Hipikat: A Project Memory for Software Development" IEEE Transactions on Software Engineering, vol. 31, No. 6, Jun. 2005, pp. 446-465.
De Lucia, A. et al., "Enhancing an Artefact Management System with Traceability Recovery Features", in Proc. of 20th IEEE International Conference on Software Maintenance (ICSM'04), Chicago, IL, 2004, pp. 1-10.
De Lucia et al., Can Information Retrieval Techniques Effectively Support Traceability Link Recovery? in Proc. of 14th IEEE International Conference on Program Comprehension (ICPC'06), Athens, Greece, Jun. 14-16, 2006, pp. 1-10.
De Lucia et al., "Recovering Traceability Links in Software Artifact Management Systems using Information Retrieval Methods" ACM Transactions on Software Engineering and Methodology, vol. 16, No. 4, Article 13, Sep. 2007, pp. 1-50.
De Lucia et al., "Incremental Approach and User Feedbacks: a Silver Bullet for Traceability Recovery?" 22nd IEEE International Conference on Software Maintenance (ICSM'06) Philadelphia, Pennsylvania, 2006, pp. 1-10.
Di Penta et al., "Traceability Recovery in RAD Software Systems" Proc. of 10th International Workshop on Program Comprehension (IWPC'02), Paris, France, 2002, pp. 1-10.
Dömges et al., "Adapting Traceability Environments to Project-Specific Needs", Communications of the ACM, vol. 41, No. 12, 1998, pp. 54-62.
Egyed. "A Scenario-Driven Approach to Trace Dependency Analysis" IEEE Transactions on Software Engineering (TSE), vol. 29, No. 2, Feb. 2003, pp. 116-132.
Egyed et al., "Automating Requirements Traceability: Beyond the Record & Replay Paradigm" Proceedings of the 17th IEEE International Conference on Automated Software Engineering (ASE'02), 2002, pp. 1-9.
Elbaum et al., "Test Case Prioritization: A Family of Empirical Studies" IEEE Transactions on Software Engineering (TSE), vol. 28, No. 2, Feb. 2002, pp. 159-182.
Enslen et al., "Mining Source Code to Automatically Split Identifiers for Software Analysis" Proc. of 6th IEEE Working Conference on Mining Software Repositories, Vancouver, BC, Canada May 16-17, 2009, pp. 71-80.
Fu et al., "Inferring Types of References to GUI Objects in Test Scripts" 2nd IEEE International Conference on Software Testing, Verification and Validation (ICST'09), Denver, CO, Apr. 2009, pp. 1-10.
Gethers et al., "Using Relational Topic Models to Capture Coupling among Classes in Object-Oriented Software Systems" Proc. Of 26th IEEE International Conference on Software Maintenance (ICSM'10), Timişoara, Romania, Sep. 12-18, 2010, pp. 1-10.
Godefroid et al., "DART: Directed Automated Random Testing" PLDI'05 Jun. 12-15, 2005, Chicago, Illinois, USA, pp. 213-223.
Godefroid et al., "Automated Whitebox Fuzz Testing" Proc. Of 16th Annual Network & Distributed System Security Symposium (NDSS'08), San Diego, California, USA, Feb. 10-13, 2008, pp. 1-16.
Gotel et al., "An Analysis of the Requirements Traceability Problem" Proc. Of First International Conference on Requirements Engineering, IEEE, 1994, pp. 94-101.

(56) References Cited

OTHER PUBLICATIONS

Grant et al., "Automated Concept Location Using Independent Component Analysis" 15th Working Conference on Reverse Engineering, 2008, pp. 138-142.
Grechanik et al., Is Data Privacy Always Good for Software Testing? 21st International Symposium on Software Reliability Engineering, IEEE, 2010, pp. 368-377.
Grechanik et al., "Exemplar: EXEcutable exaMPLes ARchive", in Proc. Of 32nd ACM/IEEE International Conference on Software Engineering (ICSE'10), Cape Town, South Africa, 2010, pp. 259-262.
Grechanik et al., "A Search Engine for Finding Highly Relevant Applications" Proc. Of 32nd ACM/IEEE International Conference on Software Engineering (ICSE'10), Cape Town, South Africa, May 2-8, 2010, pp. 475-484.
Grechanik et al., "Recovering and Using Use-Case-Diagram-To-Source-Code Traceability Links" Proc. of 6th European Software Engineering Conference and the ACM SIGSOFT Symposium on the Foundations of Software Engineering (ESEC/FSE'07), 2007, pp. 95-104.
Grechanik et al., "Evaluating Recommended Applications" Proc. of International Workshop on Recommendation Systems for Software Engineering (RSSE'08), Atlanta, GA, 2008, pp. 33-35.
Grechanik et al., "Maintaining and Evolving GUI-Directed Test Scripts" Proc. of $31^{st}$ International Conference on Software Engineering (ICSE'09), Vancouver, Canada, May 16-24, 2009, pp. 408-418.
Grindal et al., "Combination testing strategies: a survey" Software Testing, Verification and Reliability (STVR), vol. 15, No. 3, Sep. 2005, pp. 167-199.
Hayes et al., "Improving Requirements Tracing via Information Retrieval" Proc. of 11th IEEE International Requirements Engineering Conference, Monterey, California, Sep. 8-12, 2003, pp. 1-10.
Hayes et al., "Advancing Candidate Link Generation for Requirements Tracing: The Study of Methods" IEEE Transactions on Software Engineering vol. 32, No. 1, Jan. 2006, pp. 4-19.
Hill et al., "AMAP: Automatically Mining Abbreviation Expansions in Programs to Enhance Software Maintenance Tools" Proc. of 5th Working Conference on Mining Software, Repositories, Leipzig, Germany, May 2008, pp. 79-88.
HIPAA, "Health Insurance Portability and Accountability Act of 1996", 1996, 18 pages.
Cleland-Huang et al., "A Machine Learning Approach for Tracing Regulatory Codes to Product Specific Requirements" Proc. of 32nd ACM/IEEE International Conference on Software Engineering (ICSE'10), Cape Town, South Africa 2010, pp. 155-164.
Hyvärinen, A. and Oja, E., "Independent component analysis: algorithms and applications", Neural Networks, vol. 13, No. 4-5, 2000, pp. 411-430.
IAG, "IAG Consulting Business Analysis Benchmark", 2009, printed from the Internet Aug. 9, 2013, 2 pages.
IBM, "IBM Jazz" https://jazz.net/products/jazz-foundation/,printed from the Internet Aug. 9, 2013, 2 pages.
IBM, "Rational Doors" http://www-03.ibm.com/software/products/us/en/ratidoor, printed from the Internet Aug. 9, 2013, 4 pages.
IBM, "IBM Rational Software" http://www-01.ibm.com./software/rational/, printed from the Internet Aug. 9, 2013, 2 pages.
Jiang et al., "Incremental Latent Semantic Indexing for Automatic Traceability Link Evolution Management" in Proc. of 23rd IEEE/ACM International Conference on Automated Software Engineering (ASE'08), L'Aquila, Italy, 2008, pp. 59-68.
Kagdi et al., "Blending Conceptual and Evolutionary Couplings to Support Change Impact Analysis in Source Code" 17th Working Conference on Reverse Engineering, 2010, pp. 119-128.
Kagdi et al., "Who Can Help Me with this Change Request?" Proc. of $17^{th}$ IEEE International Conference on Program Comprehension (ICPC'09), Vancouver, British Columbia, Canada, 2009, pp. 273-277.
Kaner, "Software Negligence and Testing Coverage" Software QA Quarterly, vol. 2, #2, 1995, 13 pages.

Kaner, C., Bach, J., and Pettichord, B., Lessons Learned in Software Testing, New York, NY, USA, John Wiley & Sons, 2001. 306 pages.
Kim, Y. W., "Efficient use of code coverage in large-scale software development", in Proc. of $13^{th}$ Conference of the Centre for Advanced Studies on Collaborative research (CASCON '03), Toronto, Ontario, Canada, Oct. 6-9, 2003, pp. 1-11.
Kuhn, R., Lei, Y., and Kacker, R., "Practical Combinatorial Testing: Beyond Pairwise", IT Professional, vol. 10, No. 3, May 2008, pp. 19-23.
Lawrie et al., "Syntactic Identifier Conciseness and Consistency" Proceedings of the Sixth IEEE International Workshop on Source Code Analysis and Manipulation (SCAM'06), 2006, 10 pages.
Lawrie et al., "Extracting Meaning from Abbreviated Identifiers" Seventh IEEE International Working Conference on Source Code Analysis and Manipulation, IEEE 2007, pp. 213-222.
Lin et al., "Poirot: A Distributed Tool Supporting Enterprise-Wide Automated Traceability" Proc. Of 14th IEEE International Conference on Requirements Engineering (RE'06), Sep. 11-15, 2006, 2 pages.
Linstead et al., "Mining Concepts from Code with Probabilistic Topic Models" Proc. of Proceedings of the 22nd IEEE/ACM International Conference on Automated Software Engineering (ASE'07), Atlanta, Georgia, 2007, pp. 461-464.
Linstead et al., "Mining Eclipse Developer Contributions via Author-Topic Models" Fourth International Workshop on Mining Software Repositories (MSR'07) 2007, 4 pages.
Linstead et al., "Mining Internet-Scale Software Repositories" Proc. of Neural Information Processing Conference, 2007, 8 pages.
Liu et al., "Feature Location via Information Retrieval based Filtering of a Single Scenario Execution Trace" Proc. of 22nd IEEE/ACM International Conference on Automated Software Engineering (ASE'07), Atlanta, Georgia, Nov. 5-9, 2007, pp. 234-243.
Liu et al., "Modeling Class Cohesion as Mixtures of Latent Topics" 25th IEEE International Conference on Software Maintenance (ICSM'09). Edmonton, Alberta, Canada, 2009, pp. 1-10.
Lormans et al., "An industrial case study in reconstructing requirements views" Empirical Soft. Eng. (ESE), vol. 13, No. 6, Dec. 2008, pp. 727-760.
Lormans et al., "Monitoring Requirements Coverage using Reconstructed Views: An Industrial Case Study" Proc. of $13^{th}$ Working Conference on Reverse Engineering (WCRE'06), Benevento, Italy, Oct. 23-27, 2006, pp. 1-10.
Lormans et al., "Reconstructing Requirements Coverage Views from Design and Test using Traceability Recovery via LSI" Proc. of International Workshop on Traceability in Emerging Forms of Software Engineering (TEFSE'05), Long Beach, CA, Nov. 8, 2005, pp. 37-42.
Lormans et al., "Can LSI help Reconstructing Requirements Traceability in Design and Test?" Proc. of 10th European Conference on Software Maintenance and Reengineering (CSMR'06), Mar. 2006, pp. 1-10.
Lukins et al., "Source Code Retrieval for Bug Localization using Latent Dirichlet Allocation" 15th Working Conference on Reverse Engineering, 2008, pp. 155-164.
Lukins et al., "Bug localization using latent Dirichlet allocation" Information and Software Technology, vol. 52 No. 9, 2010, pp. 972-990.
Majumdar et al., "Hybrid Concolic Testing", Proc. of 29th IEEE/ACM International Conference on Software Engineering (ICSE'07), Minneapolis, Minnesota, USA, May 20-26, 2007, pp. 1-10.
Majumdar et al., "Reducing Test Inputs Using Information Partitions" Proc. of 21st International Conference on Computer Aided Verification (CAV'09), Grenoble, France, Jun. 26-Jul. 2, 2009, pp. 555-569.
Majumdar et al., "Directed Test Generation using Symbolic Grammars" Proc. of 6th Joint Meeting on European Software Engineering Conference and the ACM SIGSOFT Symposium on the Foundations of Software Engineering (ESEC/FSE'07), Dubrovnik, Croatia, Sep. 3-7, 2007, pp. 553-556.
Malaiya et al., "Software Reliability Growth With Test Coverage" IEEE Transactions on Reliability (TR), vol. 51, No. 4, Dec. 2002, pp. 420-426.
Marcus et al., "Recovering Documentation-to-Source-Code Traceability Links using Latent Semantic Indexing" Proc. of 25th IEEE/

(56) References Cited

OTHER PUBLICATIONS

ACM International Conference on Software Engineering (ICSE'03), Portland, OR, May 3-10, 2003, pp. 1-11.
Marcus et al., "Recovery of Traceability Links Between Software Documentation and Source Code", International Journal of Software Engineering and Knowledge Engineering, vol. 15, No. 4, Oct. 2005, 26 pages.
Marcus et al., "The Conceptual Cohesion of Classes" Proc. of 21st IEEE International Conference on Software Maintenance (ICSM'05), Budapest, Hungary, Sep. 25-30, 2005, 10 pages.
Marcus et al., "Using the Conceptual Cohesion of Classes for Fault Prediction in Object-Oriented Systems" IEEE Transactions on Software Engineering, vol. 34, No. 2, 2008, pp. 287-300.
Maskeri et al., "Mining Business Topics in Source Code using Latent Dirichlet Allocation" Proc. of 1st Conference on India Software Engineering Conference, Hyderabad, India, 2008, pp. 113-120.
Mathur, A. P., Foundations of Software Testing: Fundamental Algorithms and Techniques, Pearson Education, 2008, 704 pages.
McMillan et al., "Portfolio: Finding Relevant Functions and Their Usages" Proc. of 33rd IEEE/ACM International Conference on Software Engineering (ICSE'11), Honolulu, Hawaii, USA, May 21-28, 2011, pp. 111-120.
McMillan et al., "Recommending Source Code Examples via API Call Usages and Documentation" Proc. of 2nd International Workshop on Recommendation Systems for Software Engineering (RSSE'10), Cape Town, South Africa, May 4, 2010, pp. 21-25.
McMillan et al., "Combining Textual and Structural Analysis of Software Artifacts for Traceability Link Recovery" Proc. of International Workshop on Traceability in Emerging Forms of Software Engineering (TEFSE'09), Vancouver, Canada, 2009, pp. 41-48.
Murphy et al., "Software Reflexion Models: Bridging the Gap between Design and Implementation" IEEE Transactions on Software Engineering vol. 27, No. 4, 2001, pp. 364-380.
Murta et al., "Continuous and automated evolution of architecture-to-implementation traceability links" Automated Software Engineering, vol. 15, 2008, pp. 75-107.
Namin et al., "The Influence of Size and Coverage on Test Suite Effectiveness" ISSTA'09, Jul. 19-23, 2009, Chicago, Illinois, USA, pp. 57-67.
NRC, Critical Code: Software Producibility for Defense, National Academies Press, 2010. 158 pages.
Oliveto et al., "On the Equivalence of Information Retrieval Methods for Automated Traceability Link Recovery" 18th IEEE International Conference on Program Comprehension, 2010, pp. 68-71.
Petrenko et al., "Teaching Software Evolution in Open Source", IEEE Computer, vol. 40, No. 11. Nov. 2007, pp. 25-31.
Pinheiro et al., "An Object-Oriented Tool for Tracing Requirements" IEEE Software, 1996, extended abstract, 1 page.
Piwowarski et al., "Coverage Measurement Experience During Function Test" Proc. of 15th International Conference on Software Engineering (ICSE'93), Baltimore, Maryland, USA, May 17-21, 1993, pp. 287-301.
Popescu, "Java Application Profiling using TPTP" IBM, 2006, 12 pages.
Porter M., "An Algorithm for Suffix Stripping", Program, vol. 14, No. 3, Jul. 1980, pp. 130-137.
Poshyvanyk et al., "Creating and Evolving Software by Searching, Selecting and Synthesizing Relevant Source Code" ICSE'09, May 16-24, 2009, Vancouver, Canada, pp. 283-286.
Poshyvanyk et al., "Combining Probabilistic Ranking and Latent Semantic Indexing for Feature Identification" Proceedings of the 14th IEEE International Conference on Program Comprehension (ICPC'06), 2006, 10 pages.
Poshyvanyk et al., "Feature Location Using Probabilistic Ranking of Methods Based on Execution Scenarios and Information Retrieval" IEEE Transactions on Software Engineering, vol. 33, No. 6, Jun. 2007, pp. 420-432.
Poshyvanyk et al., "The Conceptual Coupling Metrics for Object-Oriented Systems" Proc. of 22nd IEEE International Conference on Software Maintenance (ICSM'06), Philadelphia, PA, Sep. 25-27, 2006, pp. 1-10.
Poshyvanyk et al., "Using Traceability Links to Assess and Maintain the Quality of Software Documentation" Proc. of International Workshop on Traceability in Emerging Forms of Software Engineering (TEFSE'07), 2007, 4 pages.
Poshyvanyk et al., "JIRiSS—an Eclipse plug-in for Source Code Exploration" Proceedings of the 14th IEEE International Conference on Program Comprehension (ICPC'06), 2006, 4 pages.
Poshyvanyk et al., "IRiSS—A Source Code Exploration Tool" Proc. of 21st IEEE International Conference on Software Maintenance (ICSM'05), Budapest, Hungary, Sep. 25-30, 2005, 4 pages.
Poshyvanyk et al., "Using information retrieval based coupling measures for impact analysis" Empirical Software Engineering, vol. 14, No. 1, 2009, pp. 5-32.
Poshyvanyk et al., "Combining Formal Concept Analysis with Information Retrieval for Concept Location in Source Code" Proc. of 15th IEEE International Conference on Program Comprehension (ICPC'07), Banff, Alberta, Canada, Jun. 2007, 10 pages.
Poshyvanyk et al., "Source Code Exploration with Google" Proc. of 22nd IEEE International Conference on Software Maintenance (ICSM'06), Philadelphia, PA, 2006, 4 pages.
Qusef et al., "Recovering Traceability Links between Unit Tests and Classes Under Test: An Improved Method" Proc. of 26th IEEE International Conference on Software Maintenance (ICSM'10), Sep. 2010, 10 pages.
Ramesh et al., "Toward Reference Models for Requirements Traceability" IEEE Transactions on Software Engineering, vol. 27, No. 1, 2001, pp. 58-93.
Reisner et al., "Using Symbolic Evaluation to Understand Behavior in Configurable Software Systems" Proc. of 32nd ACM/IEEE International Conference on Software Engineering (ICSE'10), Cape Town, South Africa, May 2-8, 2010, pp. 445-454.
Revelle et al., "Using Data Fusion and Web Mining to Support Feature Location in Software" 18th IEEE International Conference on Program Comprehension, 2010, pp. 14-23.
Revelle et al., "An Exploratory Study on Assessing Feature Location Techniques" Proc. of 17th IEEE International Conference on Program Comprehension (ICPC'09), Vancouver, British Columbia, Canada, May 17-19, 2009, pp. 218-222.
Richardson et al., "Automating Traceability for Generated Software Artifacts" Proceedings of the 19th International Conference on Automated Software Engineering (ASE'04), 2004, 10 pages.
Sarbanes-Oxley, "Sarbanes-Oxley Act of 2002", 2002, 66 pages.
Savage et al., "Topic$_{xp}$: Exploring Topics in Source Code using Latent Dirichlet Allocation" Proc. of 26th IEEE International Conference on Software Maintenance (ICSM'10), Timişoara, Romania, Sep. 12-18, 2010, 6 pages.
Sen et al., "CUTE: A Concolic Unit Testing Engine for C" ESECFSE'05, Sep. 5-9, 2005, Lisbon, Portugal, pp. 263-272.
Settimi et al., "Supporting Software Evolution through Dynamically Retrieving Traces to UML Artifacts" Proc. of 7th International Workshop on Principles of Software Evolution (IWPSE), Kyoto, Japan, 2004, 6 pages.
Srikanth et al., "Reducing Field Failures in System Configurable Software: Cost-Based Prioritization" Proc. of 20th IEEE International Conference on Software Reliability Engineering (ISSRE'09), Nov. 16-19, 2009, pp. 61-70.
Stewart et al., "How to Avoid Software Inspection Failure and Achieve Ongoing Benefits", CrossTalk: The Journal of Defense Software Engineering, vol. 21, No. 1, 2008, pp. 23-27.
Stone, J., Independent Component Analysis: A Tutorial Introduction, 2005, 193 pages.
Tian et al., "Using Latent Dirichlet Allocation for Automatic Categorization of Software" Proc. of 6th IEEE Working Conference on Mining Software Repositories (MSR'09), Vancouver, British Columbia, Canada, May 16-17, 2009, pp. 163-166.
Ujházi et al., "New Conceptual Coupling and Cohesion Metrics for Object-Oriented Systems" Proc. of 10th IEEE International Working

(56) References Cited

OTHER PUBLICATIONS

Conference on Source Code Analysis and Manipulation (SCAM'10), Timişoara, Romania, Sep. 12-13, 2010, pp. 33-42.

United States of America—Department of Defense, "Trusted Computer System Evaluation Criteria (TCSEC)" 1985, 116 pages.

Wing J., "Computational Thinking", Communications on the ACM, vol. 49, No. 3, Mar. 2006, 3 pages.

Xie et al., "Fitness-Guided Path Exploration in Dynamic Symbolic Execution" Proc. of 39th Annual IEEE/IFIP International Conference on Dependable Systems and Networks (DSN 2009), Lisbon, Portugal, Jun. 29-Jul. 2, 2009, pp. 359-368.

Xie et al., "3D Visualization for Concept Location in Source Code" Proc. of 28th IEEE/ACM International Conference on Software Engineering (ICSE'06), Shanghai, China, May 20-28, 2006, pp. 839-842.

Yadla et al., "Tracing requirements to defect reports: an application of information retrieval techniques" Innovations in Systems and Software Engineering: A NASA Journal, vol. 1, No. 2, Sep. 2005, pp. 116-124.

Yin, R. K., Applications of Case Study Research, 2 ed., CA, USA, Sage Publications, Inc, 2003, 98 pages.

Yoon et al., "Prioritizing Component Compatibility Tests via User Preferences" Proc. of 23rd IEEE International Conference on Software Maintenance (ICSM'09), Edmonton, Alberta, Canada, Sep. 20-26, 2009, pp. 29-38.

Zhu et al., "Software Unit Test Coverage and Adequacy" ACM Computing Surveys (CSUR), vol. 29, No. 4, Dec. 1997, pp. 366-427.

Zou, "Improving Automated Requirements Trace Retrieval Through Term-Based Enhancement Strategies" Depaul University, Chicago, Illinois, 2009, 131 pages.

* cited by examiner

SYSTEM FOR ENSURING COMPREHENSIVENESS OF REQUIREMENTS TESTING OF SOFTWARE APPLICATIONS

BACKGROUND

Two distinct milestones of any software development lifecycle are requirements gathering and acceptance testing, when a software product is validated against its requirements. This validation is one of the most difficult tasks, because it involves bridging an abstraction gap between high-level descriptions of requirements and their low-level implementations in source code. Unfortunately, linking acceptance tests to requirements is an exceedingly difficult, manual, laborious and time-consuming task.

At least two dimensions make it important to determine what requirements have been tested. First, is an economic dimension. If a purpose of testing is to find bugs and there is no evidence that some requirements have been tested, what confidence can stakeholders of a software product have in the software product? Equally important is the legislative dimension, where different laws dictate that evidence should be provided on how different requirements are tested, or how diverse artifacts that are related to requirements and tests are traced to one another. Some of these laws are recent (e.g., Health Insurance Portability and Accountability Act (HIPAA) and the Sarbanes-Oxley Act), while the others are standards that have been around for decades (e.g., US Government Department of Defense (DoD) standard on Trusted Computer System Evaluation Criteria (TCSEC)).

For example, many companies that build software products for DoD must comply with the level A of TCSEC that requires proof of verified design, where functionality of the products matches their requirements. The complexity of tracing acceptance tests to requirements and other artifacts (e.g., use-cases, sequence diagrams, state chart diagrams, source code and test cases) may make it difficult for stakeholders to simultaneously comply with economic and legal demands for traceability.

BRIEF SUMMARY

Methods, system, and computer readable media are provided for ensuring comprehensive testing of software requirements for a software application.

In one aspect, a method may include receiving data that defines artifacts of a software project that includes application requirements, application code comprised of a plurality of code modules, and test cases. A first sub-link between at least one application requirement and at least one code module of the application code is identified. The first sub-link indicates a relationship between the application requirement and the code module. A second sub-link between at least one test case and the code module is identified. The second sub-link indicates a relationship between the test case and the code module. A traceability link between the test case and the application requirement is determined based on the first sub-link and the second sub-link. The traceability link indicates that the test cases test the software application for compliance with the application requirement.

In a second aspect, a system may include input circuitry configured to receive data that defines artifacts of a software project. The artifacts may include application requirements, application code comprised of a plurality of code modules, and test cases. A traceability link generator of the system is configured to identify a first sub-link between at least one application requirement and at least one code module of the application code. The first sub-link indicates a relationship between the application requirement and the code module. The traceability link generator is further configured to identify a second sub-link between at least one test case and the code module. The second sub-link indicates a relationship between the test case and the module. The traceability link generator determines a traceability link between the test case and the application requirement based on the first sub-link and the second sub-link. The traceability link indicates that the test case tests the software application for compliance with the application requirement.

In a third aspect, a non-transitory machine-readable storage medium includes code for causing a machine to receive data that defines artifacts of a software application. The artifacts include application requirements, application code comprised of a plurality of code modules, and test cases. The code causes the machine to identify a first sub-link between at least one application requirement and at least one code module of the application code. The first sub-link indicates a relationship between the application requirement and the code module. The code further causes the machine to identify a second sub-link between at least one test case and the code module. The second sub-link indicates a relationship between the test case and the module. The code causes the machine to determine a traceability link between the test case and the application requirement based on the first sub-link and the second sub-link. The traceability link indicates that the test case tests the software application for compliance with the application requirement.

DETAILED DESCRIPTION

The embodiments below describe an exemplary embodiment of a system for ensuring comprehensive testing of software requirements for a software application. In particular, the system is configured to analyze various artifacts of a software application such as requirements documents, models, source code, test cases, and other artifacts related to the software application. The system is further configured to compare the various artifacts via various techniques described below to identify relationships between the various artifacts and ultimately traceability links between test cases and requirements. The system then generates a report 140 (FIG. 1) of the traceability links that facilitates determining untested requirements. Additional test cases may be generated to test the untested requirements.

Figure 1:
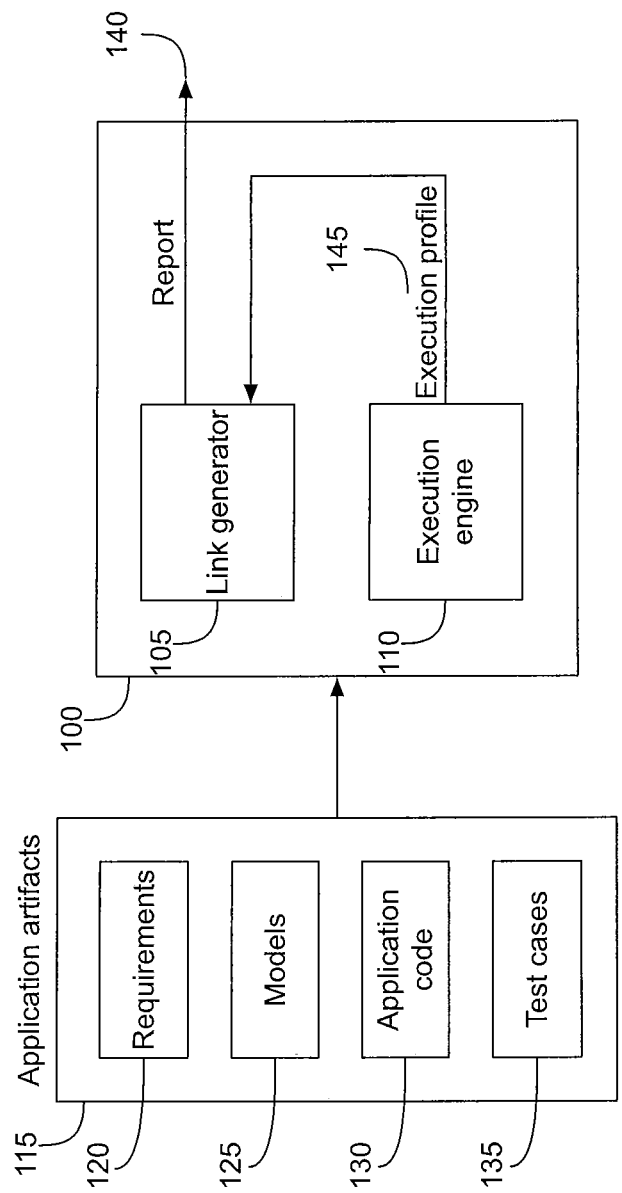
FIG. 1 illustrates an exemplary system for ensuring comprehensive testing of software requirements for a software application.

FIG. 1 illustrates an exemplary system 100 for ensuring comprehensive testing of software requirements for a software application. The system 100 includes a traceability link generator 105 and a test case execution engine 110. The traceability link generator 105 and test case execution engine 110 may correspond to an Intel®, AMD®, or PowerPC® based computer or a different computer. The traceability link generator 105 and test case execution engine 110 may include an operating system, such as, for example, a Microsoft Windows®, Linux, Unix® or other operating system and may be configured to communicate with other computers via an interface, such as a network interface. The traceability link generator 105 and the test case execution engine 110 may reside on a single computer system or be distributed among several computers interconnected by a communication network.

The traceability link generator 105 includes code, logic, and/or other circuitry that generates traceability links between artifacts 115 of a software application. Exemplary artifacts of the software application may include high level application requirements 120, models 125, application code 130, and test cases 135 for testing the application. Other artifacts include execution profiles, state diagrams, and other items that characterize the application.

Figure 2A:
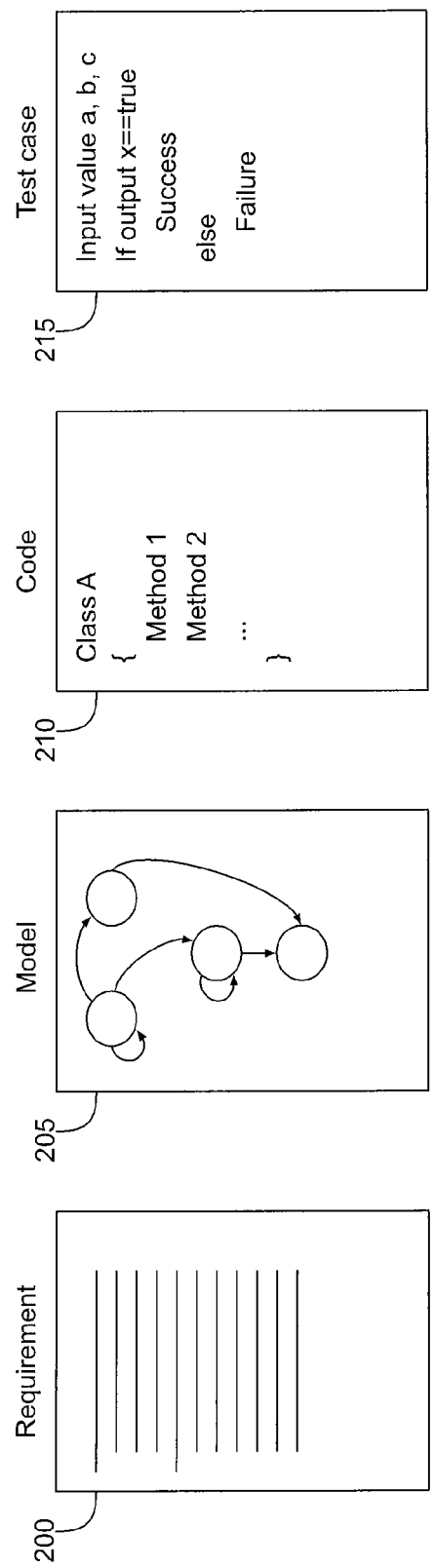
FIG. 2A illustrates exemplary artifacts of a software application.
Figure 2B:
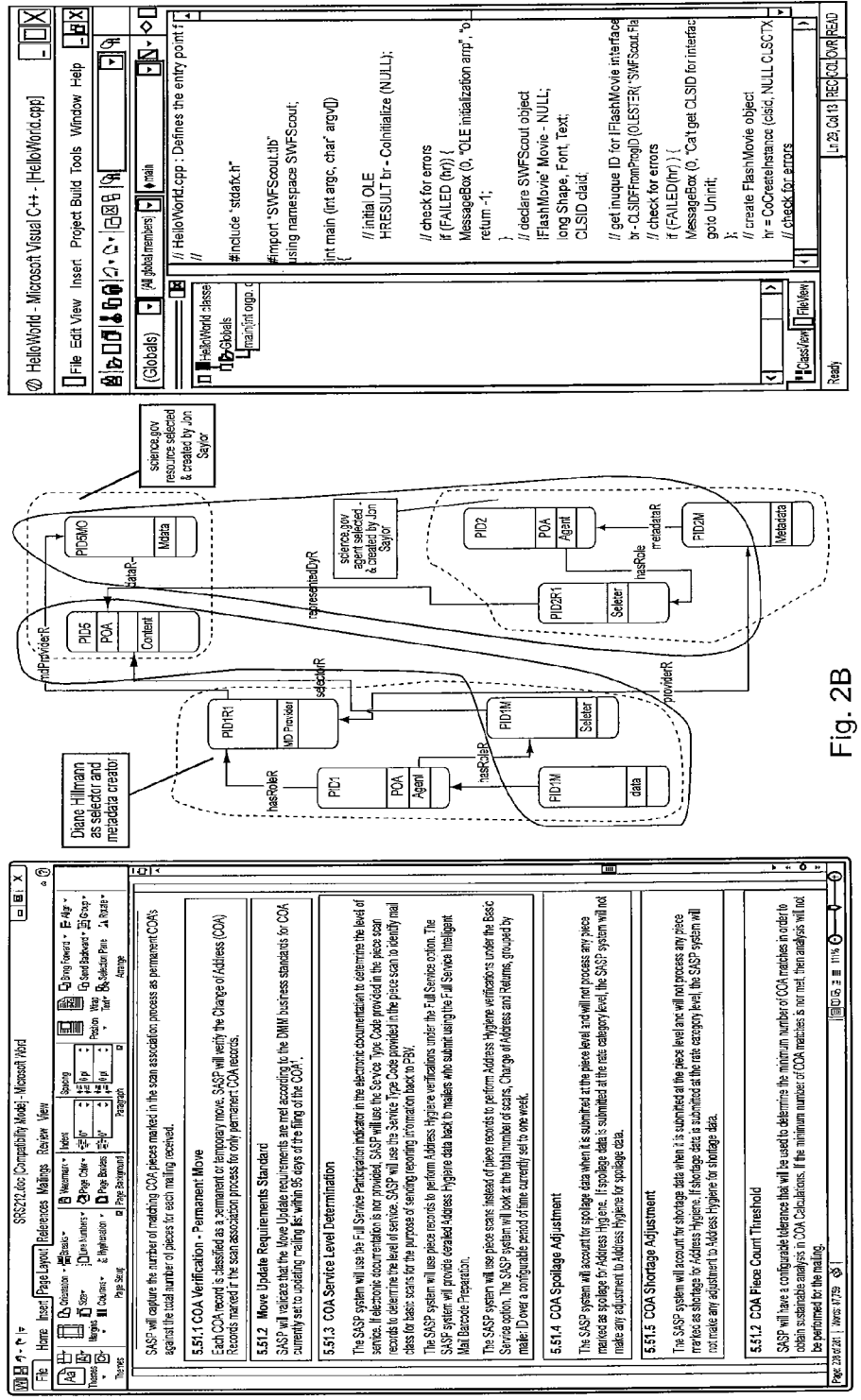
FIG. 2B illustrates exemplary requirements, models, and application code that may correspond to the artifacts of FIG. 2A.

Referring to FIG. 2A, an application requirement 120 may correspond to a requirement document 200 or entries in the requirements document 200 that specifies high-level requirements for the application, such as the requirement document 200 illustrated in FIG. 2B. For example, the high-level requirements may be specified in plain English sentences so that a non-technical person may understand the requirements. High-level requirements may be specified in other formats, such as presentation slides that combine visual components and text to describe the various requirements. The high-level requirements may be specified in other formats and in other languages.

The models 125 may include architectural diagrams 205 that describe the layout and hi-level operations performed by the application. An exemplary architectural diagram 205 is illustrated in FIG. 2B. For example, architectural diagrams 205 may include block diagrams, flow charts, use-case diagrams, message sequence charts and other diagrams that describe the functions performed by the application.

The application code 130 may correspond to source code 210 that implements the application. The source code 210 may be written in languages such as Java, C, C++, or other such languages, as illustrated by the exemplary code 210 of FIG. 2B. In this regard, the source code 210 is generally represented in a textual/human readable format. The source code 210 may include other data files, such as resource files, XML files, or other data files that specify various portions of the application.

The test cases 135 may correspond to source code or scripts 215 configured to exercise aspects of the application code 130. For example, a script 215 may be configured to input information into text fields of the application and verify output results. In an embodiment, the test cases 135 may be represented in a textual/human readable format. In alternative embodiments, other formats, such as XML, may be utilized.

Returning to FIG. 1, the test case execution engine 110 includes code, logic, and/or other circuitry for executing the application code 130 according to the test cases 135. The test case execution engine 110 is configured to generate an execution profile 145 of the application code 130. The execution profile 145 is a temporal listing of code executed during a given run. For example, the execution profile 145 may be a text file that identifies various functions and methods invoked during a given run of the application. The execution profile 145 may facilitate understanding of the program flow of the application. For example, the execution profile 145 may facilitate determining modules within the application code 130 (e.g., classes, methods, and functions) that operate together when a given test case 135 is executed. The execution profile 145 may also facilitate identifying modules that are related to one another.

In operation, the system 100 analyzes the various artifacts 115 to determine whether traceability links between requirements 120 and test cases 135 exist, as described in more detail below. The system 100 may generate a traceability link diagram to convey this information.

Figure 3A:
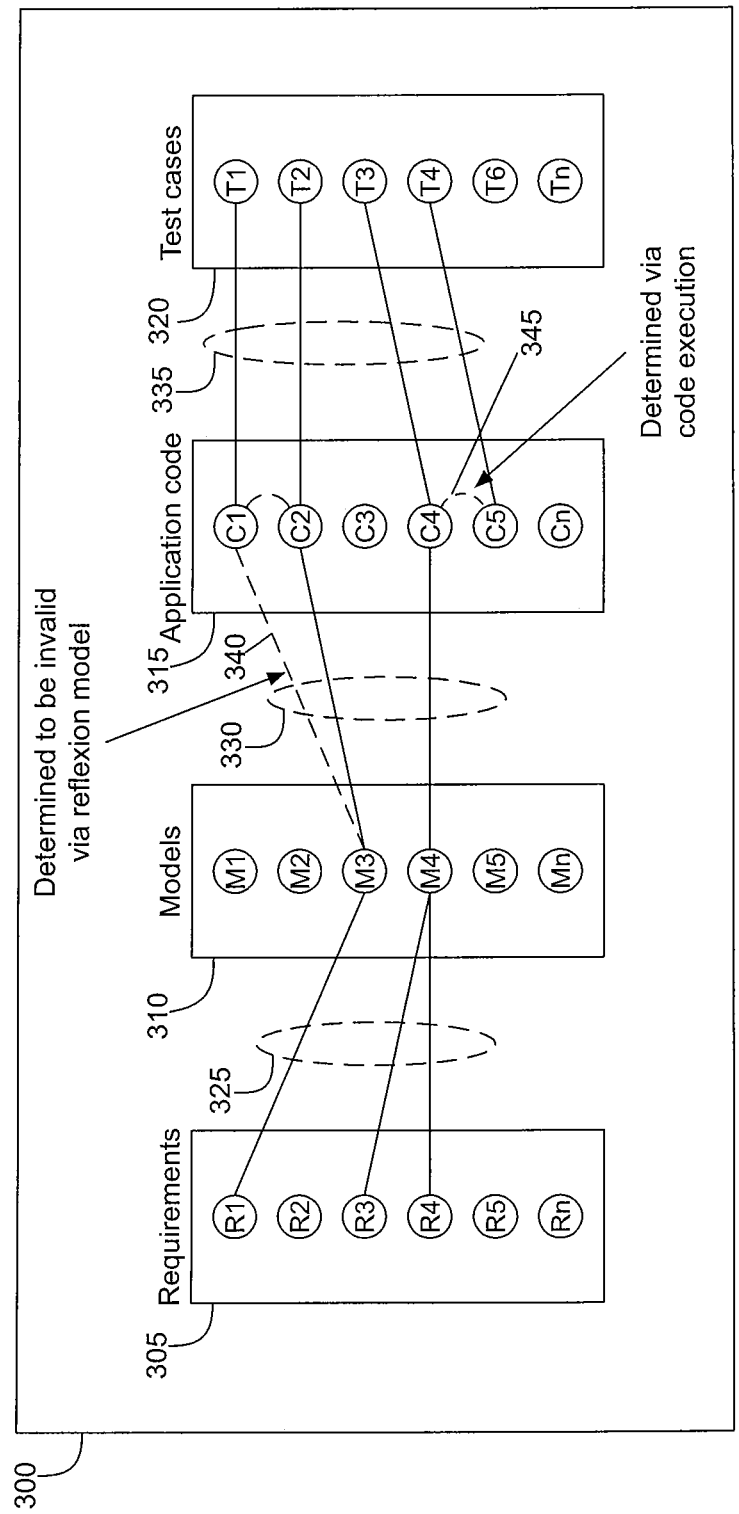
FIG. 3A is an exemplary traceability link diagram that may be generated by the system.

FIG. 3A is an exemplary traceability link diagram 300 that may be generated by the system. The traceability link diagram 300 includes a list of requirements 305, models 310, application code modules 315, and test cases 320. The various items may be extracted by the link generator 105 from the artifacts 115 input into the system 100. Sub-links 325, 330, and 335 link respective artifacts of the traceability link diagram 300 to one another and indicate a relationship between linked artifacts. A first group of sub-links 325 represents a relationship between respective requirements of the list of requirements 305 and respective modules of the list of models 310. A second group of sub-links 330 represents a relationship between respective models of the list of models 310 and respective application code modules of the list of application code modules 315. A third group of sub-links 335 represents a relationship between respective application code modules of the list of application code modules 315 and respective test cases of the list of test cases 320.

Figure 3B:
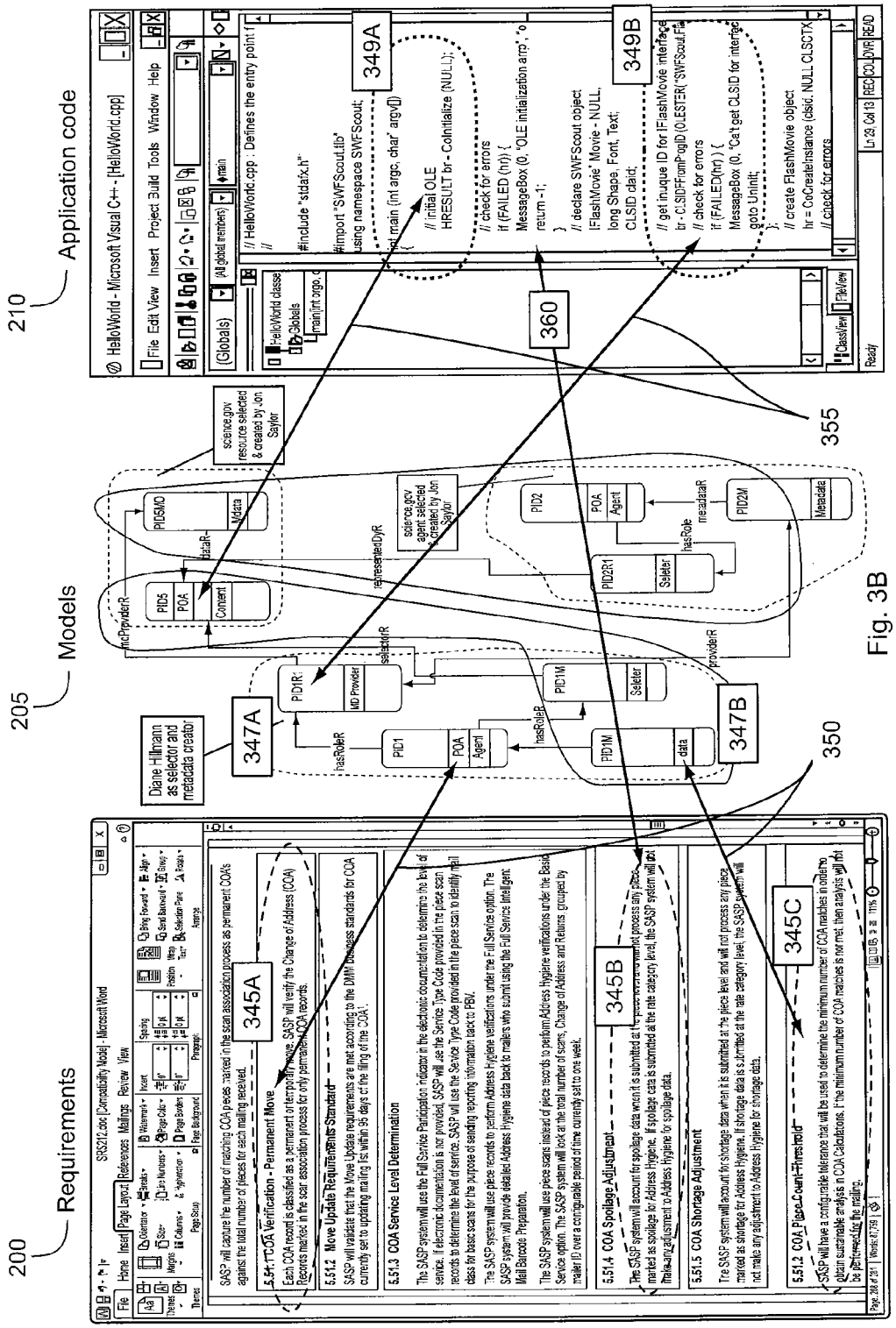
FIG. 3B illustrates a traceability link diagram applied to the requirements, models, and application code of FIG. 2A.

FIG. 3B illustrates an exemplary traceability link diagram as it applies to the exemplary requirements 200, models 205, and application code 210 of FIG. 2B. Referring to FIG. 3B, sub-links 350 are determined to link requirements 345A and 345C to models 347A and 347B, respectively. Similarly, sub-links 355 are determined to link the models 347A and 347B to code sections 349A and 349B, respectively. This in turn implies a link 360 between the requirements 200 and the application code 210.

As described below, the links are determined through various techniques. Establishment of a traceability link from a requirement to a test case indicates that the requirement is tested to some degree. A traceability link is a path comprised of one or more sub-links between artifacts that collectively link a requirement to a test case. The traceability link may be understood as an indication of a degree of confidence that a test case tests code that implements a given requirement. Traceability links may comprise one or more sub-links between artifacts. For example, a traceability link between requirement R1 of the list of requirements 305 and test case T1 of the list of test cases 320 indicates that test case T1 tests requirement R1 to some degree. The traceability link in this case, in the example shown in FIG. 3, includes a first link from requirement R1 to model M3, a second link from model M3 to application code module C1, and a third link from application code module C1 to test case T1. A second traceability link indicates that test case T2 also tests requirement R1 to some degree. In other words, the traceability link diagram 300 indicates that two test requirement R1 to some degree.

The traceability link diagram 300 may be configured differently. For example, in some implementations greater or fewer types of artifacts may be utilized to determine traceability links. In some cases, for example, models may not be included. In this case, the requirements may be linked directly to the code. In addition or alternatively, links may be generated directly between, for example, a test case and a requirement, or a test case and a model. Other combinations of links may exist. Traceability links between requirements and test cases need not pass through all artifacts.

The existence of a traceability link between a test and a requirement does not necessarily guarantee that the test case actually tests the application for compliance with the requirement. As described below, several techniques are utilized to bridge the gap between test cases and requirements. In some instance, a traceability link between a requirement and test case may only be discovered from one of the techniques. In other instances, the traceability link may be discovered by additional techniques. The more often a traceability link is discovered, the greater the confidence that the test case actually tests code that implements a given requirement. In some implementations, indicators may be utilized to represent this confidence level. For example, a traceability link that is discovered by several techniques may be represented in green and a traceability link that is only discovered via a single technique may be represented in orange. Other techniques for indicating a reliability of a traceability link may be utilized, such as numeric indicators that represent a score where the higher the score, the higher the reliability. In this regard, the link generator 105 may include logic configured to evaluate the scores to convey to the test personnel the degree of confidence in any given traceability link.

Figure 4:
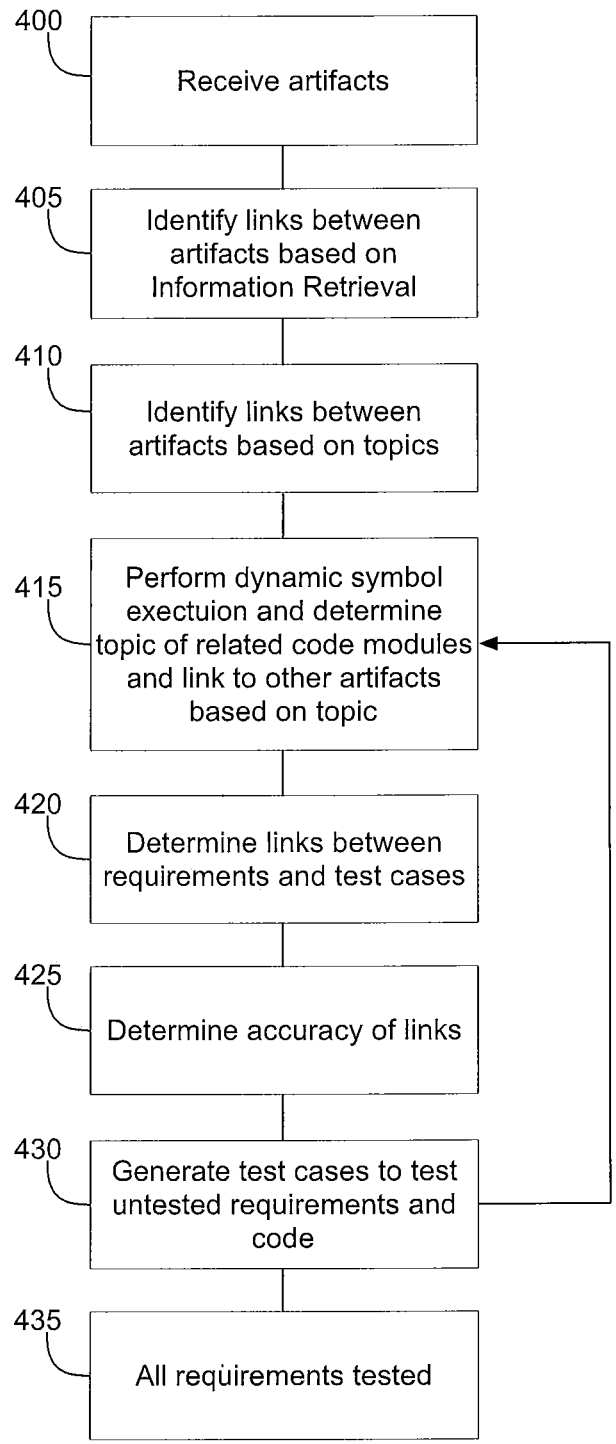
FIG. 4 illustrates exemplary operations that may be performed by the system.

FIG. 4 illustrates exemplary operations that may be performed by the system 100. The operations the determination of traceability links between test cases and requirements. The operations may be represented as instructions in a machine-readable format that are stored in one or more non-transitory types of computer readable media, such as solid state memories, hard drives, and the like. The instructions may be executed by components of the system 100 to cause the system 100 to carry out the operations described in FIG. 4

At block 400, artifacts of an application may be communicated to the system, as shown in FIG. 1. The artifacts may include requirements, models, source code, and test cases related to the application. Other artifacts known in the art may be communicated.

At block 405, the artifacts are analyzed via information retrieval (IR) techniques to determine whether the various artifacts are linked/related to one another. For example, the similarity between the words in the text of the various software artifacts is determined by the link generator 105 and relies on the assumption that if two artifacts have high textual similarity, they share similar concepts in their context. Word similarity between artifacts is determined by comparing, by the link generator 105, a set of source artifacts (used as a query) against another (even overlapping) set of target artifacts and ranking all possible pairs of artifacts based on the similarities. The textual similarity between two artifacts is based on the occurrences of terms (i.e., words) within the artifacts. The extraction of the terms from the artifacts may be preceded by text normalization for removing most non-textual tokens (e.g., operators, special symbols, and some numbers) and splitting source code identifiers into separate words. A morphological analysis (i.e., stemming) of the extracted terms is performed by the link generator 105 to remove suffixes of words to extract their stems. The extracted information is generally stored in an m×n matrix, where m is the number of all terms that occur in all the artifacts, and n is the number of artifacts.

An entry of this matrix denotes a measure of the weight (i.e., relevance) of the $i^{th}$ term in the $j^{th}$ artifact. The weighting may be computed according to a weighing scheme known as term frequency/inverse document frequency. Term frequency awards terms appearing in an artifact with a high frequency, while inverse document frequency penalizes terms appearing in too many artifacts (i.e., non-discriminating terms.) That is, a term is considered relevant for representing artifact content and is assigned a relatively high weight if it occurs many times in the artifact, and is contained in a small number of artifacts. Based on the term-by-document matrix representation, different information retrieval (IR) techniques known in the art may be used to rank conceptual similarities between pairs of artifacts. For example, vector space based models may be utilized. In vector space based models, target artifacts are ranked against source artifacts by computing a distance function between the corresponding vectors (e.g., cosine of the angle between two artifact vectors.

At block 410, the artifacts are analyzed via techniques for determining topics of the artifacts to determine whether the various artifacts are linked/related to one another by topic. For example, relational topic models (RTM) may be utilized to capture conceptual relationships among software artifacts in order to determine the degree of similarities among them. RTM is a probabilistic topic model that models both documents (i.e., artifacts) and links between documents (i.e., traceability links) within a software corpus. RTM extends Latent Dirichlet Allocation (LDA) to allow for the prediction of links between documents based on underlying topics and known relationships amongst documents. Topics extracted by LDA correspond to likelihood distributions, which indicate how likely a word is to be assigned to a specific topic. Additionally, each document is modeled as a probability distribution indicating how likely it is that the document expresses each topic. In order to apply LDA on software, a software application is represented as a collection of artifacts (i.e., classes, requirements, external documents, models, test cases, etc.) where each document is associated with a set of concepts (i.e., topics). LDA attempts to identify a set of topics based on word co-occurrences and define a specific mixture of these topics for each document (i.e., class) in the corpus (i.e., a software application).

Next, the RTM is utilized to predict links between documents based on the context (i.e., underling latent topics) and relationships of documents in a corpus. In RTM, prediction of links, which are modeled as binary random variables, is dependent on the information modeled by LDA (e.g., probabilistic topic assignments to the documents in a corpus). Generating a model consists of two main steps: modeling the documents in a corpus and modeling the links between all the pairs of documents. The first step is identical to the generative process for LDA, whereas the links among the documents are modeled by techniques of logistic regression in the second step.

Figure 5:
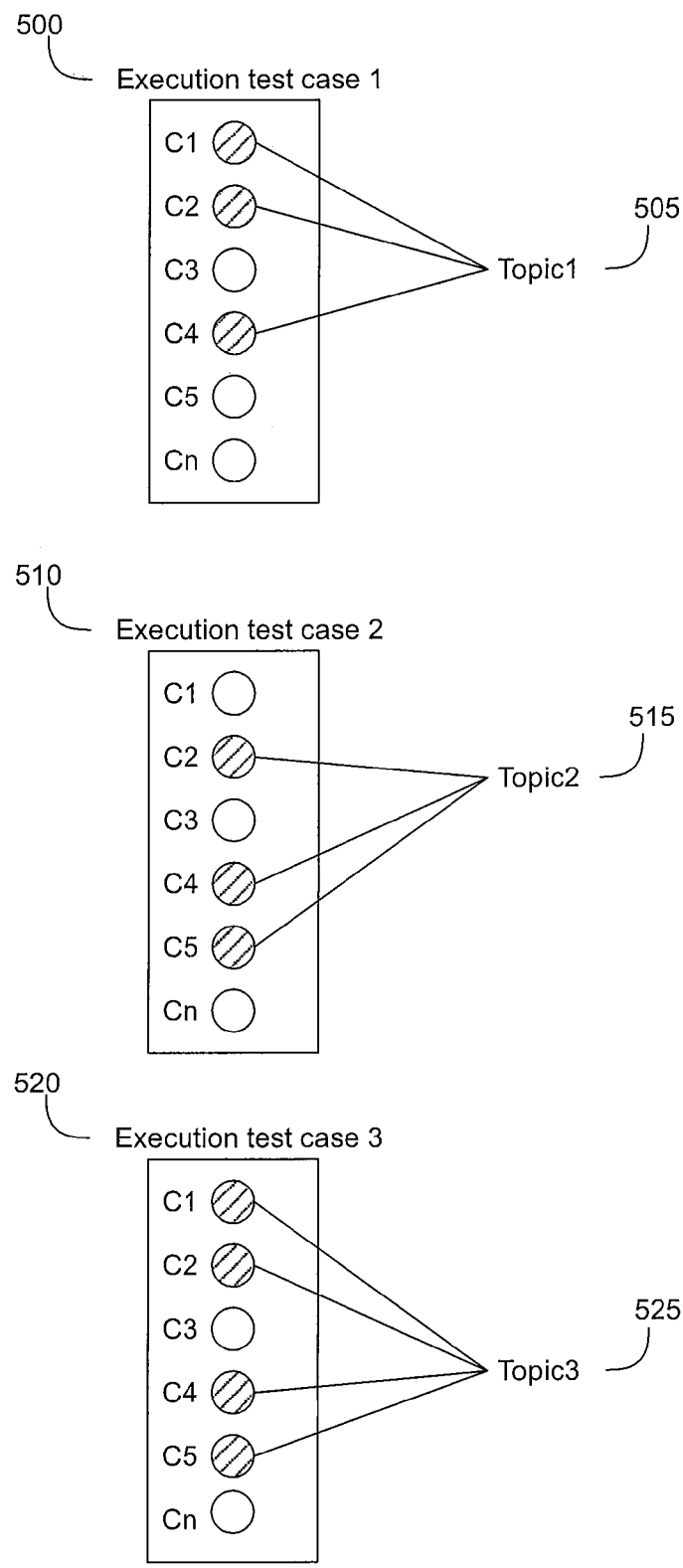
FIG. 5 illustrates code modules invoked during execution of different test cases.

At block 415, dynamic symbol execution of the code is performed. That is, test cases are executed against the application to determine relationships between application code modules. For example, referring to FIG. 5, execution of test case one 500 may result in execution of modules C1, C2, and C4 of the application code. Execution of test case two 510 may result in execution of modules C2, C4, and C5 of the application code. Execution of test case three 520 may result in execution of modules C1, C2, C4, and C5 of the application code. The combination of modules invoked during a given execution run indicates a relationship between code modules and may, therefore, be utilized to establish a traceability link from a test case to a requirement. For example, referring back to FIG. 2A, a traceability link between requirement R4 and test case T4 may be established in part via a link 345 discovered between code module C4 and C5. Similarly, a traceability link between requirement R1 and test case T1 may be established in part via a link discovered between code module C1 and C2.

Additionally or alternatively, a topic may be determined from the combination of modules in addition to the modules individually, as described above in block 410. For example, a combination of related code modules may be selected and combined into a single document. The topic for the combined code modules in the document may be determined via the topic modeling techniques described above. A topic determined to be associated with a collection of modules may be more accurate than a topic determined to be associated with an individual module as a larger amount of text (i.e., code) is analyzed to determine the topic. For example, referring to FIG. 5, a first topic 505 may be determined to be associated with the combination of code modules C1, C2, and C4 based on the first execution profile 500. A second topic 515 may be determined to be associated with the combination of code modules C2, C4, and C5 based on the second execution profile 510. A third topic 525 may be determined to be associated with the combination of code modules C1, C2, C4, and C5 based on the third execution profile 520. Thus, these code modules may be collectively linked to models that share a similar topic via that techniques described above.

At block 420, traceability links between requirements and test cases may be determined. For example, referring to FIG. 3A, a traceability link between requirement R1 and test case T1 may be discovered based on a first link from requirement R1 to model M3 of the first group of links 325, a second link from model M3 to application code module C1 of the second group of links 330, and a third link from application code module C1 to test case T1 of the third group of links 335. Similarly, a second traceability link indicates that test case T2 also tests requirement R1 to some degree. More generally, the system finds traceability links by finding all paths from any given test case to any given requirements via sub-link traversal.

At block 425, the accuracy of links may be determined. In some implementations, that accuracy is determined via user feedback. For example, the exemplary traceability link diagram 300 of FIG. 3A may be communicated to one or more users with detailed knowledge regarding at least some links between the various artifacts. The users may indicate that a given link is invalid and, therefore, flag the link as such. Elimination of a link may result in the elimination of other links derived on the basis of the invalidated link. For example, referring to FIG. 4, the traceability link between requirement R4 and test case T4 may be eliminated by virtue of the removal of the link 345 between code modules C4 and C5.

In some implementations, the links between models and application code modules may be compared with one or more reflexion models of the application code modules. A reflexion model is a high-level software model derived from the application code itself. Nodes in the reflexion model will link to the application code modules of the application code. The links between respective nodes of the reflexion model and the application code modules are compared with the links derived from the techniques described earlier between code modules and application code modules. That is, a determination is made as to whether the links derived based on the reflexion model match links derived from the other techniques described above. In an ideal situation, a reflexion model will match a model upon which the application is based. Therefore, links derived from the reflexion model will match the links derived through the other techniques. The reflexion model may be utilized to verify the validity of links between models and application code. For example, through information retrieval and relational topic modeling, links may be discovered between model M3 and code modules C1 and C2. However, model M3 may in reality only model the behavior of code module C2. Reflexion modeling of the application code may generate a model whereby it may be determined that model M3 does not model code module C1. In this case, the link 340 between model M3 and code module C1 may be marked as invalid.

In some implementations, an accuracy indicator of a given sub-link and/or traceability link may be generated and conveyed to a user. The accuracy indicator may indicate the strength of the relationship between respective artifacts that are linked. The strength may be indicated by a numerical value, color, symbol, or via a different manner. The strength may be determined based on, for example, the number of different ways in which a given link is identified. For example, the strength of a link identified via word similarity and topic matching may be greater than the strength of a link identified by only a single technique. The strength may be proportionate to the number of words or topics matched between respective artifacts. Other techniques for measuring the strength of the relationship between artifacts may be used.

At block 430, additional test cases may be generated for testing untested requirements. For example, based upon the traceability link diagram 300 of FIG. 3A, it may be determined that requirements R2 and R5 are untested. Therefore, test cases specifically designed to test these requirements may be generated.

Further evaluation of the traceability link diagram 300 may indicate that specific code modules are not invoked in any test. For example, the execution traces may reveal that code module C3 is never invoked by any test case. In this case, a test case for testing code module C3 may be generated.

If new tests are generated, then the operations may repeat from block 415. At block 415, the new test cases may be analyzed against the application to determine additional relationships/links among code modules, and topics among the code modules invoked during execution of the new test case, as described above. If no new tests are required, then the operations finish at block 435.

Figure 6:
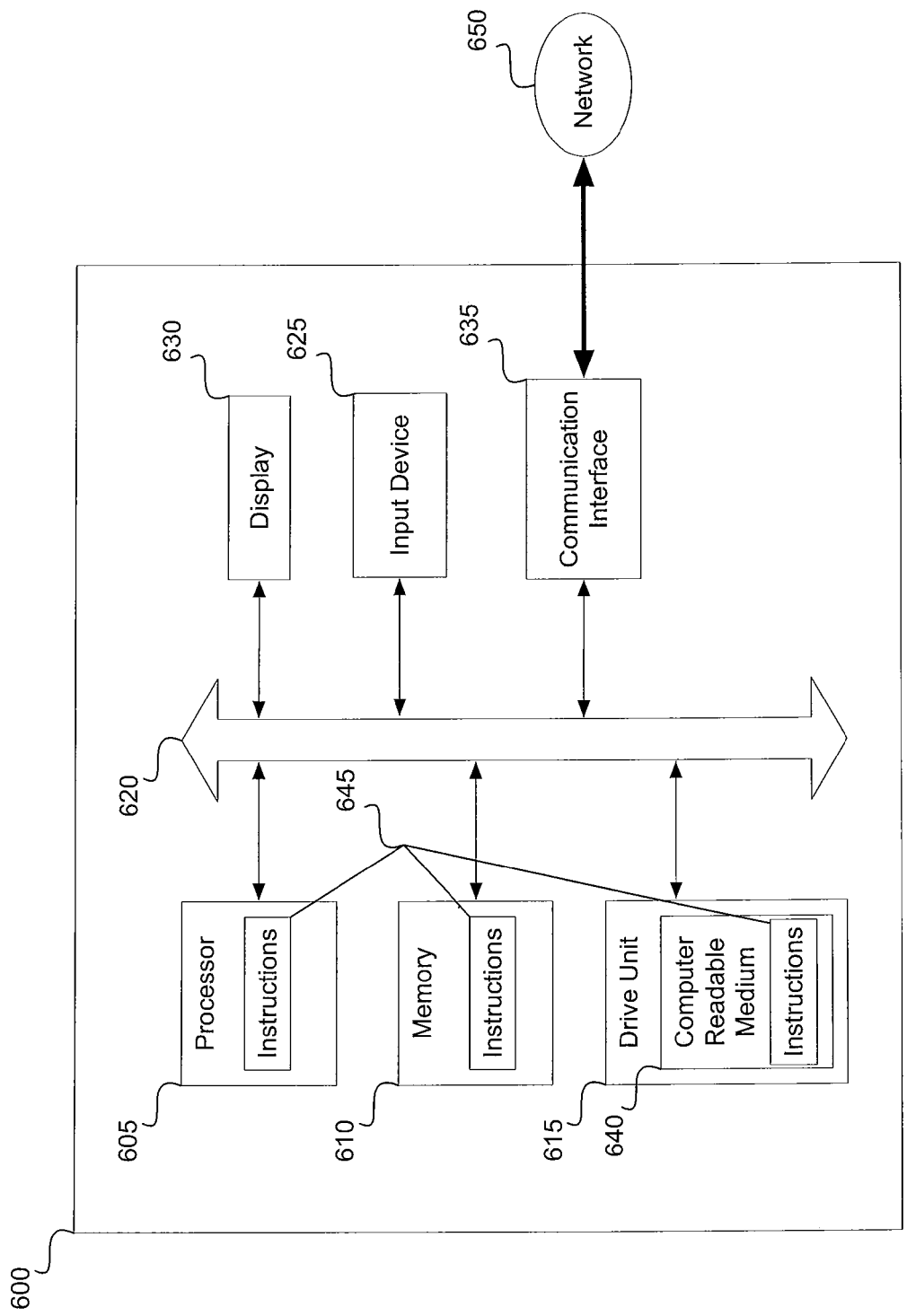
FIG. 6 illustrates a general computer system that may represent any of the computing devices referenced herein.

FIG. 6 illustrates a computer system 600 that may implement the traceability link generator 105, the test case execution engine 110, or any other logic referenced herein. The computer system 600 may include a set of instructions 645 that the processor 605 may execute to cause the computer system 600 to perform any of the analysis described above. The computer system 600 may operate as a stand-alone device or may be connected, e.g., using a network, to other computer systems or peripheral devices.

In a networked deployment, the computer system 600 may operate in the capacity of a server or as a client-user computer in a server-client user network environment, or as a peer computer system in a peer-to-peer (or distributed) network environment. The computer system 600 may also be implemented as or incorporated into various devices, such as a personal computer or a mobile device, capable of executing the instructions 645 (sequential or otherwise) that specify actions to be taken by that machine. Further, each of the systems described may include any collection of sub-systems that individually or jointly execute a set, or multiple sets, of instructions to perform one or more computer functions.

The computer system 600 may include one or more memory devices 610 on a bus 620 for communicating information. In addition, code operable to cause the computer system to perform any of the operations described above may be stored in the memory 610. The memory 610 may be a random-access memory, read-only memory, programmable memory, hard disk drive or any other type of memory or storage device.

The computer system 600 may include a display 630, such as a liquid crystal display (LCD), a cathode ray tube (CRT), or any other display suitable for conveying information. The display 630 may act as an interface for the user to see the functioning of the processor 605, or specifically as an interface with the software stored in the memory 610 or in the drive unit 615.

Additionally, the computer system 600 may include an input device 625, such as a keyboard or mouse, configured to allow a user to interact with any of the components of system 600.

The computer system 600 may also include a disk or optical drive unit 615, such as the high-latency storage 110 (FIG. 1). The disk drive unit 615 may include a computer-readable medium 640 in which the instructions 645 may be stored. The instructions 645 may reside completely, or at least partially, within the memory 610 and/or within the processor 605 during execution by the computer system 600. The memory 610 and the processor 605 also may include computer-readable media as discussed above.

The computer system 600 may include a communication interface 635 to support communications via a network 650. The network 650 may include wired networks, wireless networks, or combinations thereof. The communication interface 635 network may enable communications via any number of communication standards, such as 802.11, 802.12, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

As shown, the described system and operations may allow for determining the comprehensiveness of requirements testing of software applications. In particular, the system is configured to analyze various artifacts of a software application such as requirements documents, models, source code, test cases, and other artifacts related to the software application. The system is configured to compare the various artifacts via information retrieval techniques, relational topic modeling, and dynamic symbol execution to identify relationships between the various artifacts. Traceability links between test cases and requirements are determined based on the relationships between the various artifacts. The system then generates a report of the traceability links that enables determining which requirements are tested. Additional test cases are then generated to test untested requirements. The system determines new relationships between artifacts based on the additional test cases.

While methods and systems has been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present methods and systems not be limited to the particular embodiment disclosed, but that the disclosed methods and systems include all embodiments falling within the scope of the appended claims.

I claim:

1. A method for determining a comprehensiveness of software requirements tests for testing a software application, the method comprising: receiving data that defines artifacts of a software application, the artifacts including application requirements, application code comprised of a plurality of code modules, and test cases; identifying, by a traceability link generator, a first sub-link between at least one application requirement and at least one code module of the application code, where the first sub-link indicates a relationship between the at least one application requirement and the at least one code module, wherein identification of the first sub-link comprises: executing at least one test case to determine related code modules; determining a topic associated with the determined related code modules; and comparing a topic associated with the determined related code modules with a topic associated with the at least one application; identifying, by the traceability link generator, a second sub-link between at least one test case and the at least one code module, where the second sub-link indicates a relationship between the at least one test case and the at least one code module; determining, by the traceability link generator, a first traceability link between the at least one test case and the at least one application requirement based on the first sub-link and the second sub-link, whereby the traceability link indicates that the at least one test case tests the software application for compliance with the at least one application requirement; wherein the existence of the first traceability link is determined based upon a number of algorithms, wherein the traceability link generator is further configured to determine a reliability value that represents an accuracy of the existence of the first traceability link between the at least one test case and the at least one application requirement; and wherein the reliability value is determined as a function of the number of algorithms by which the existence of the first traceability link is determined such that the reliability value increases as the number of algorithms increases; determining an existence of a second traceability link between an application and test case based at least in part on the determination of the first traceability link; communicating information regarding the first and second traceability links to a user; receiving an indication from the user that the first traceability link is invalid; and determining the second traceability link to be invalid based at least on the indication from the user.

2. The method according to claim 1, wherein identification of the first sub-link comprises determining a word similarity between the at least one application requirement and the at least one code module.

3. The method according to claim 2, further comprising determining, by the traceability link generator, a topic associated with the at least one code module and matching the determined topic to a topic of the at least one application requirement.

4. The method according to claim 3, wherein the topic associated with the at least one code module is determined based on a Latent Dirichlet Allocation model.

5. The method according to claim 2, further comprising: selecting a combination of code modules of the plurality of code modules that are related; and determining a topic associated with the combination of code modules.

6. The method according to claim 1, wherein executing at least one test case to determine related code modules further comprises: capturing an execution trace of the application code while executing the at least one test case.

7. The method according to claim 1, wherein the artifacts further comprise at least one code model that models the application code at an abstraction level above the application code, and wherein the first sUb-link comprises a first portion between at least one application requirement and the at least one code model, and a second portion between the at least one code model and at the least one code module of the application code.

8. The method according to claim 7, further comprising automatically generating, based on the application code, a second model of the application code and comparing the second model with the at least one model to verify an accuracy of the first sub-link.

9. The method according to claim 8, wherein the second model is a reflexion model of the application code.

10. The method according to claim 1, further comprising generating a report that illustrates the artifacts and respective links of the first sub-link, the second sub-link, and the determined traceability link between the artifacts.

11. The method according to claim 10, further comprising generating, for each determined link, an accuracy indicator associated with the determined link.

12. The method according to claim 1, further comprising: determining a requirement that is not linked to a test case; and generating a new test case that tests the software application for compliance with the determined requirement.

13. A system for determining a comprehensiveness of software requirements tests for testing a software application comprised of a plurality of code modules, the system comprising: input circuitry configured to receive data that defines artifacts of a software project, the artifacts including application requirements, application code comprised of a plurality of code modules, and test cases; and a traceability link generator configured to: identify a first sub-link between at least one application requirement and at least one code module of the application code, where the first sub-link indicates a relationship between the at least one application requirement and the at least one code module; identify a second sub-link between at least one test case and the at least one code module, where the second sub-link indicates a relationship between the at least one test case and the at least one code module; determine an existence of a first traceability link between the at least one test case and the at least one application requirement based on the first sub-link and the second sub-link, whereby the first traceability link indicates that the at least one test case tests the software application for compliance with the at least one application requirement, wherein the existence of the first traceability link is determined based upon a number of algorithms, wherein the traceability link generator is further configured to determine a reliability value that represents an accuracy of the existence of the first traceability link between the at least one test case and the at least one application requirement, and wherein the reliability value is determined as a function of the number of algorithms by which the existence of the first traceability link is determined such that the reliability value increases as the number of algorithms increases; determining an existence of a second traceability link between an application and test case based at least in part on the determination of the first traceability link; communicating information regarding the first and second traceability links to a user; receiving an indication from the user that the first traceability link is invalid; and determining the second traceability link to be invalid based at least on the indication from the user.

14. The system according to claim 13, wherein identification of the first sublink comprises determining a word similarity between the at least one application requirement and the at least one code module.

15. The method according to claim 14, wherein the traceability link generator is further configured determine a topic associated with the at least one code module and matching the determined topic to a topic of the at least one application requirements.

16. The method according to claim 15, wherein the topic associated with the at least one code module is determined based on a Latent Dirichlet Allocation model.

17. A non-transitory machine-readable storage medium having stored thereon a computer program comprising at least one code section for determining a comprehensiveness of software requirements tests for testing a software application, the at least one code section being executable by a machine for causing the machine to perform acts of: receiving data that defines artifacts of a software application, the artifacts including application requirements, application code comprised of a plurality of code modules, and test cases; identifying a first sub-link between at least one application requirement and at least one code module of the application code, where the first sub-link indicates a relationship between the at least one application requirement and the at least one code module; identifying a second sub-link between at least one test case and the at least one code module, where the second sub-link indicates a relationship between the at least one test case and the at least one code module; determining an existence of a first traceability link between the at least one test case and the at least one application requirement based on the first sub-link and the second sub-link, whereby the first traceability link indicates that the at least one test case tests the software application for compliance with the at least one application requirement, wherein the existence of the first traceability link is determined based upon a number of algorithms, wherein the traceability link generator is further configured to determine a reliability value that represents an accuracy of the existence of the first traceability link between the at least one test case and the at least one application requirement, and wherein the reliability value is determined as a function of the number of algorithms by which the existence of the first traceability link is determined such that the reliability value increases as the number of algorithms increases; determining an existence of a second traceability link between an application and test case based at least in part on the determination of the first traceability link; communicating information regarding the first and second traceability links to a user; receiving an indication from the user that the first traceability link is invalid; and determining the second traceability link to be invalid based at least on the indication from the user.

18. The non-transitory machine-readable storage according to claim 17, wherein identification of the first sub-link comprises determining a word similarity between the at least one application requirement and the at least one code module.

19. The non-transitory machine-readable storage according to claim 18, further comprising determining, by the traceability link generator, a topic associated with the at least one code module and matching the determined topic to a topic of the at least one application requirements.

20. The non-transitory machine-readable storage according to claim 19, wherein the topic associated with the at least one code module is determined based on a Latent Dirichlet Allocation model.

\* \* \* \* \*